United States Patent [19]

Schroeder, Jr.

[11] Patent Number: 4,464,509
[45] Date of Patent: Aug. 7, 1984

[54] APPARATUS AND METHOD FOR PREPARING POLYMERS

[75] Inventor: Donald E. Schroeder, Jr., Littleton, Colo.

[73] Assignee: Marathon Oil Company, Findlay, Ohio

[21] Appl. No.: 515,402

[22] Filed: Jul. 20, 1983

[51] Int. Cl.³ ............................................. C08C 19/00
[52] U.S. Cl. ..................................... 525/53; 422/134; 422/136; 523/318; 525/329.4
[58] Field of Search ............... 525/53, 329.4; 523/318; 422/134, 136

[56] References Cited

U.S. PATENT DOCUMENTS 2,933,476  4/1960  Fisher ............................. 422/134 X
3,784,597  1/1974  Fujimoto et al. ............ 525/329.4 X
4,254,249  3/1981  Cottrell et al. .................... 525/329.4

OTHER PUBLICATIONS

Chemical Engineers' Handbook, Perry et al., 5th Ed., (1973), pp. 21-4 to 21-6.

Primary Examiner—Joseph L. Schofer
Assistant Examiner—S. Babajko
Attorney, Agent, or Firm—Jack L. Hummel; Rodney F. Brown

[57] ABSTRACT

Apparatus and method of preparing a partially hydrolyzed polymer solution, especially a partially hydrolyzed polyacrylamide solution, for use in secondary and tertiary oil recovery operations which involves the in-line introduction of a relatively concentrated solution of a hydrolyzing agent into a polymer stream having a relatively high concentration of the polymer, and thereafter intimately mixing, under heat, the polymer stream and the hydrolyzing agent while controlling the flow rate of the reaction mixture. The reaction mixture is then held in a post hydrolysis tank where the reaction is allowed to go to completion.

9 Claims, 2 Drawing Figures

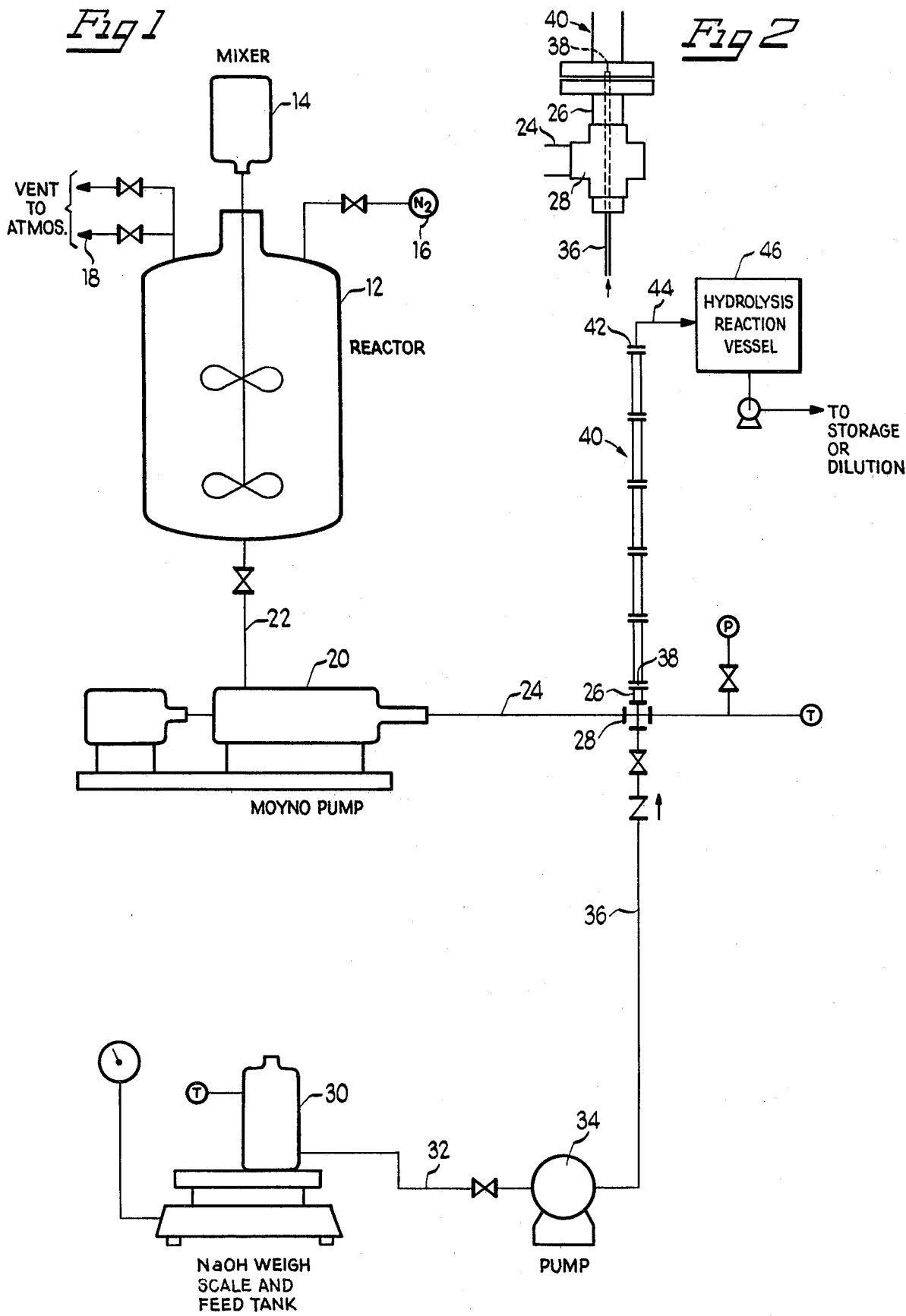

APPARATUS AND METHOD FOR PREPARING POLYMERS

TECHNICAL FIELD

This invention is directed to the preparation of aqueous polymer solutions, particularly aqueous polymer solutions of the type employed in the secondary and tertiary recovery of oil from subterranean oil-bearing formations or reservoirs.

BACKGROUND OF THE INVENTION

The recovery of residual oil from oil-bearing subterranean formations or reservoirs utilizing as a drive fluid, or mobility buffer, an aqueous solution containing a polymer such as a partially hydrolyzed polyacrylamide has been shown to be both effective and economically feasible. While various techniques for the preparation of aqueous polymer solutions have been proposed, the solutions usually are prepared by forming an aqueous solution of a monomer in a vessel of suitable volume. The monomer may be in the form of a solid or a liquid. Exemplary of such a monomer is acrylamide which is available commercially both in solid form, or as a 50%, by weight, $Cu^{++}$ inhibited aqueous solution. When employed in the latter form, the $Cu^{++}$ inhibited solution advantageously is first passed through an ion exchange resin to remove the copper ions. The aqueous monomer solution in the vessel, whether the monomer is employed in the form of a solid or a liquid, will comprise from about 1% to about 10%, more or less, by weight, monomer. The monomer solution is then sparged with nitrogen to reduce the concentration of oxygen in the solution to a desired level. A polymerization initiator thereafter is introduced into the vessel containing the monomer solution, and polymerization of the monomer is allowed to proceed until complete. In the case of acrylamide, polymerization is usually completed in from 8 to 12 hours. The aqueous polymer solution is then pumped to a second vessel where a hydrolyzing agent such as a dilute aqueous solution of a monovalent alkali metal hydroxide exemplified by sodium hydroxide is introduced. The resulting reaction mixture of 1–2 wt. % polymer is retained in the second vessel for a period of 10 to 12 hours, or more, to enable partial hydrolyzation of the polyacrylamide to go to completion. The resulting aqueous solution of partially hydrolyzed polymer may then be transferred to a holding tank for temporary storage, or it may be further diluted for immediate injection into an input well.

The substantial time periods required in completing the polymerization of the monomer, and the subsequent partial hydrolyzation of the formed polymer, by the above described process derogate from its use in an on-site, semi-continuous, or continuous system for preparing partially hydrolyzed polymers of the type employed in the secondary and tertiary recovery of oil where a constant supply of large volumes of aqueous polymer solution is needed to successfully carry out the operation.

SUMMARY OF THE INVENTION

The present invention is directed to apparatus, and to a method, for preparing aqueous polymer solutions, especially aqueous partially hydrolyzed polyacrylamide solutions, which significantly shorten the time normally required to prepare such solutions. More specifically, the apparatus and method of the invention enable partial hydrolyzation of a polymer such as polyacrylamide to be achieved in approximately one sixth the time consumed in carrying out hydrolysis of the polymer by conventional means. What is more, these significant time savings can be realized with hydrolysis equipment of greatly reduced size in relation to standard equipment used for this purpose. The smaller size of the equipment not only results in lower equipment costs, but, also, has the added important advantage of improving the portability of the apparatus thereby making it more easily adaptable to on-site preparation of the polymer solutions. The partially hydrolyzed polymer solutions prepared by the method of this invention are characterized by their effectiveness in meeting the performance demands of substantially any subterranean oil-bearing formation or reservoir, thereby resulting in optimum oil recovery.

The foregoing, and other features and advantages of the present invention will become clear from the description to follow, taken in conjunction with the accompanying drawing.

BRIEF DESCRIPTION OF THE DRAWING

FIG. 1 is a diagrammatic view of an embodiment of the apparatus of this invention illustrating a reactor for polymerizing an aqueous solution of a monomer; means for the in-line feeding of a hydrolyzing agent into the aqueous polymer solution formed in the reactor; and means in which the hydrolyzation of the polymer is completed; and FIG. 2 is a detailed diagrammatic view of the section of the apparatus shown in FIG. 1 at which the hydrolyzing agent is introduced, in-line, into the polymer solution.

DETAILED DESCRIPTION OF THE INVENTION

While the apparatus and method of the present invention can be adapted for the preparation of various aqueous polymer solutions, in accordance with a preferred practice of the invention, the solutions are prepared from a water soluble monomer containing at least one vinyl grouping wherein the vinyl group is an acrylyl vinyl, a vinyl cyanide, a styryl vinyl, or a water soluble salt thereof. Exemplary of monomers having utility for the purposes of this invention are acrylamide, acrylic acid, acrylonitrile, methacrylic acid, methacrylamide, methacrylonitrile, methylmethacrylate and sodium styrenesulfonate. Of this group, acrylamide is the preferred starting monomer. The acrylamide can be any of various commercially available polymerization grade acrylamides sold in solid form, or in the form of aqueous solutions. The concentration of the monomer in the starting solution advantageously is in the range of from about 1% to about 10%, preferably about 4% to about 8%, by weight.

The polymerization of the monomer is carried out in the presence of a suitable vinyl polymerization initiator or catalyst, or a combination of initiators or catalysts. Especially useful are free radical forming compounds such as the azo compounds exemplified by azobisisobutyronitrile, azobisisobutyamidine chloride; peroxides such as hydrogen peroxide, sodium peroxide and benzoyl peroxide; alkyl and dialkyl peroxides such as, for example, t-butyl hydrogen peroxide and diethyl peroxide; alkali metal and ammonium persulfates exemplified by sodium persulfate, potassium persulfate and ammonium persulfate; and alkali metal bisulfites such as sodium bisulfite and potassium bisulfite. Where the monomer employed is acrylamide, a cocatalyst system comprising ammonium persulfate and sodium bisulfite is preferred. The ratio of persulfate to bisulfite in such a system can range from about 9:1 to about 1:9.

The temperature at which the polymerization is conducted is somewhat variable. In the polymerization of acrylamide, for example, the temperature of the reaction mixture desirably should be in the range of from about 30° C. to about 80° C., preferably from about 35° C. to about 50° C. Boiling should be avoided. Polymerization times, likewise, are variable. Again, using acrylamide as the monomer, polymerization of the monomer is permitted to proceed for a period of from 8 to 12 hours, usually about 9 or 10 hours.

When polymerization is completed, an amount of a monovalent base such as sodium or potassium hydroxide is incorporated into the aqueous polymer solution to hydrolyze from about 20 to about 50 mole percent of the amide groups, in the case of a polymer such as polyacrylamide, or ester groups, in the case of a polymer such as polymethylmethacrylate. In achieving the objectives of the present invention, the hydrolyzing agent, preferably at a concentration range of 10–50% and more preferably about 30–50% by weight, is introduced into the polymer solution in-line, that is, a stream of the hydrolyzing agent is fed, at a controlled rate and volume, into a stream of the aqueous polymer solution. The combined streams desirably are passed into a mixing means where they are intimately mixed and heated, if desired, to promote the hydrolysis reaction. After a short residence time in the mixing means, the reactants flow to a holding tank where hydrolysis of the polymer is completed. The concentration of the polymer in the reaction mixture preferably is within the range of 4–8 weight percent. As indicated, this practice enables hydrolyzation of the polymer to be carried out in a fraction of the time required utilizing standard equipment. The ratio of hydrolyzing agent to polymer employed in the practice of the invention is somewhat variable. Thus, for example, where the polymer solution comprises 6% by weight polyacrylamide and the hydrolyzing agent employed is a 50% by weight aqueous solution of sodium hydroxide, the ratio of hydroxide solution to polymer solution will range from about 0.5 to about 2 parts by volume of the hydroxide solution to about 100 parts by volume of the polymer solution. The temperature at which the hydrolyzation is carried out can range from about 35° C. to about 55° C., preferably from about 40° C. to about 45° C. Employing the foregoing criteria, hydrolyzation of the polymer can be completed in from 2.5 to 4.5 hours, usually in from 3 to 3.5 hours.

Referring, now, to the drawing, the embodiment of the apparatus of the present invention illustrated in FIG. 1 comprises a vessel or reactor 12 having a mixer 14 associated therewith. The vessel or reactor 12 is in communication with a source 16 of nitrogen, and is vented to atmosphere at 18. A pump 20 is connected to the outlet of the vessel or reactor 12 through a conduit 22. The discharge end of the pump 20 is connected to a conduit 24 which intersects a polymer feeder conduit 26. In the embodiment shown, the conduits 24 and 26 are joined to a cross fitting 28. A vessel 30 is connected by a conduit 32 to a pump 34, the discharge end of which is connected to a hydrolyzing agent feeder conduit 36. As best shown in FIG. 2, the conduit 36 extends into and through the cross fitting 28, and terminates in a small diameter injection nozzle 38 centrally positioned within the aqueous polymer solution stream, and facing in the direction of the inlet of a plurality of interconnected static mixer elements designated generally by reference numeral 40. A thermocouple or dial thermometer advantageously is connected to the remaining opening in the cross fitting 28. The outlet end 42 of the interconnected mixer elements 40 are joined to a conduit 44 which connects to a reaction storage vessel 46 where sufficient residence time is allowed to essentially complete the hydrolysis reaction. From this reaction storage vessel the polymer flows to either a storage tank or to an area where dilution of the aqueous polymer solution may be carried out prior to injection into an input well.

The internal diameter of the conduits 24 and 26 desirably are essentially the same. The corresponding dimension of the feeder conduit 36 is not narrowly critical and is selected to meet the demands of the well site. The diameter of the orifice of the injection nozzle 38, is selected to obtain a reasonably high velocity through the nozzle (6 to 8 ft/sec) to insure uniform distribution in the static mixer. The orifice is located about 1 pipe diameter before the static mixer elements at the center line of flow. The static mixer elements employed may be of the Koch type comprising from 15 to 25, usually 20, elements of the BY type.

The following example is illustrative of the present invention.

EXAMPLE

A 100 gallon glass-lined Pfaudler reactor was charged with 783 lbs. of Denver tap water. The analysis of the water indicated 280 ppm total dissolved solids, 110 ppm total hardness, 80 ppm calcium and a pH of 8.8. The reactor was purged with nitrogen to reduce the oxygen level to approximately 0.2 ppm, and the water was heated to 42° C. Fifty pounds of acrylamide briquettes were added to the water in the reactor, and the contents were agitated to dissolve the acrylamide. Thereafter, the reactor was again purged with nitrogen to reduce the dissolved oxygen level to approximately 0.1 ppm. A solution containing 3.06 grams of sodium bisulfite was added to the reactor with the agitator running. After 5 minutes, 6.08 grams of ammonium persulfate in solution were added to the reactor. The reaction mixture was agitated for 2 hours at which time the reactor temperature had reached 52° C. indicating polymerization was occurring. The agitator was shut off and the reaction was allowed to proceed for another 8 hours. The polymer solution was pumped from the reactor through a two inch conduit and was intermixed with a 50% aqueous solution of sodium hydroxide passing through a conduit having a 0.18 inch internal diameter and provided with a 0.025 inch nozzle positioned at the inlet of a 2 inch Koch static mixer with 20 elements type BY 316SS. Naphthol Green B was added to the sodium hydroxide solution so that the mixing results could be visually observed. The hydrolysis was conducted at a temperature of 44° C. The polyacrylamide was pumped into the mixer at a rate of about 9 lbs./min. The sodium hydroxide was pumped into the mixer at a rate of about 0.125 lbs./min. at a nozzle velocity of 6.4 ft. per second. The residence time of the reactants in the mixer was 1–2 minutes. Samples of the intimately mixed reactants which were uniformly colored with the dye were stored for various lengths of time at these conditions to determine when the reaction was complete. The hydrolysis was completed in 3.5 hours. Analysis of the end product showed that approximately 30 mole percent of the amide groups of the polyacrylamide had been converted to carboxylate groups. The screen factor and the viscosity of the partially hydrolyzed polyacrylamide were compared to a partially hydrolyzed polyacrylamide prepared by the conventional batch process. At a polymer concentration of 1000 ppm, the screen factor and viscosity of the polymer prepared by the method of this invention were 24 and 145 (Brookfield at 72° F.), respectively, compared to 20 and 82, respectively, for the polymer produced by the batch process.

I claim:

1. A method of preparing an aqueous polymer solution for use in the displacement of oil from a subterranean oil-bearing formation, comprising: forming in a reaction vessel an aqueous reaction mixture containing a polymerizable substance and a polymerization initiator, said polymerizable substance including a monomer having at least one vinyl grouping wherein the vinyl group is an acrylyl vinyl, a vinyl cyanide, a styryl vinyl, or a water soluble salt thereof; maintaining the reaction mixture in said vessel until polymerization of the polymerizable substance is substantially complete to provide an aqueous polymer solution; forming the aqueous polymer solution into a stream, the concentration of polymer in said solution being about 4% to about 8% by weight; injecting at substantially the center line of flow, and in the direction of flow, of the aqueous polymer solution stream an aqueous solution containing a hydrolyzing agent capable of reacting with the polymer in the aqueous polymer solution, the concentration of the hydrolyzing agent in the aqueous solution thereof being about 10% to about 50% by weight, the ratio of hydrolyzing agent solution to aqueous polymer solution injected being about 0.5 to about 2 parts of hydrolyzing agent solution to about 100 parts of aqueous polymer solution; passing the combined solutions through static mixers at a flow rate such that the hydrolyzing agent is intimately admixed with the polymer solution; and maintaining the hydrolyzing agent and the polymer solution in an intimately admixed state until hydrolyzation of the polymer is essentially complete.

2. A method according to claim 1 wherein the solution of hydrolyzing agent is injected into the aqueous polymer solution through a restricted orifice at a point adjacent to the entry of the combined solutions into the static mixers.

3. A method according to claim 1 wherein the polymerizable substance comprises an acrylamide at a concentration of about 6% by weight in a water solution.

4. A method according to claim 1 wherein the hydrolyzing agent solution comprises a 50% aqueous solution of an alkali metal hydroxide.

5. A method according to claim 2 wherein the restricted orifice comprises a nozzle positioned directly in the center line of the aqueous polymer solution stream, and facing in the direction of flow of said stream.

6. A method according to claim 1 wherein the rate of flow of the combined solutions is such that the residence time of the combined solutions in the static mixers is from about 1 second to about 5 minutes, and wherein the hydrolysis reaction is completed in about 2.5 to about 24 hours.

7. Apparatus for the on-site preparation of aqueous polymer solutions for use in the displacement of oil from subterranean oil-bearing formations, comprising: a reactor vessel for polymerizing an aqueous solution of a monomer in the presence of a polymerization catalyst; flow control means for forming the aqueous polymer solution from the reactor vessel into a stream having a predetermined flow rate, the concentration of the polymer in said stream being about 4% to about 8% by weight; flow control means including a nozzle having a restricted orifice for introducing a stream of an aqueous solution of a hydrolyzing agent into the aqueous polymer solution stream, said nozzle being positioned in the polymer solution stream at substantially the center line of flow thereof and facing in the direction of flow of said polymer solution stream; static mixers for intimately admixing the combined streams as they flow therethrough, the inlet side of said mixers being positioned adjacent to said nozzle; and means for maintaining the hydrolyzing agent and the polymer solution in an intimate admixed condition until hydrolyzation of the polymer is essentially complete.

8. Apparatus according to claim 7 wherein the flow control means for the aqueous polymer solution comprises a conduit having an internal diameter of about 50 to 100 times greater than the internal diameter of the restricted orifice of the nozzle.

9. Apparatus according to claim 7 wherein the outlet of the static mixers is in communication with a post hydrolysis reactor positioned downstream of the static mixers.

* * * * *